United States Patent Office 3,000,869
Patented Sept. 19, 1961

3,000,869
CROSS-LINKING OF ALKYL VINYL
ETHER POLYMERS
George C. Wright, Bel Air, Md., and John Hunsberger, Easton, Pa., assignors to General Aniline & Film Corporation, New York, N.Y., a corporation of Delaware
No Drawing. Filed Mar. 15, 1957, Ser. No. 646,194
10 Claims. (Cl. 260—91.1)

This invention relates to improvements in the cross-linking of alkyl vinyl ether polymers, and relates more particularly to a novel process for the cross-linking of alkyl vinyl ether polymers employing catalyst of the Friedel-Crafts type.

The cross-linking of vinyl ether polymers, whereby the separate molecules of the polymer become linked together by covalencies to give a net-like structure, is well known in the art. By the process of cross-linking the vinyl ether polymers the properties of said polymers change appreciably.

It is an important object of this invention to provide a novel process for cross-linking alkyl vinyl ether polymers employing Friedel-Crafts catalysts which will inexpensively and expeditiously modify the properties of said polymers to render them suitable for industrial application.

Another object of this invention is the provision of compositions of Friedel-Crafts catalyzed alkyl vinyl ether polymers which are stable against cross-linking for an appreciable length of time.

Other objects and advantages of this invention will be apparent from the following detailed description and claims.

In accordance with this invention an alkyl vinyl ether polymer is treated with a relatively small amount of a Friedel-Crafts catalyst for a time sufficient for the cross-linking of said polymer. The cross-linking procedure may be effected in two ways. Firstly, the alkyl vinyl ether polymer in the dry state is mixed with the Friedel-Crafts catalyst and the said mixture milled in a suitable mixer such as a Werner-Pfleiderer mixer, a rubber mill or the like. The resulting mixture is permitted to stand for a few days during which time the cross-linking of the polymer takes place. Secondly, and this is the preferred manner of cross-linking the alkyl vinyl ether polymer, the said polymer and catalyst are first dissolved in a mutual solvent, after which the solvent is removed by air-drying and/or heating the solution, and the residual dry composition is allowed to stand for several days or heated for several hours whereby cross-linking of the alkyl vinyl ether polymer is effected. A very advantageous result of using a mutual solvent to form a solution of the polymer and catalyst is that the resulting solution is stable against cross-linking for periods of at least three months. This feature is of importance from the standpoint of inventory considerations.

The solution of alkyl vinyl ether polymer and catalyst may be produced by dissolving the polymer and catalyst, simultaneously or separately in either order, in the mutual solvent. Preferably, only the minimum amount of solvent necessary to dissolve the polymer and catalyst and to yield a fairly fluid solution should be employed for reasons of economy and expediency in removing the solvent at a later stage in the process of this invention. It has been found that a suitable range of polymer concentration in the solution is from 15 to 50% or more by weight, depending upon the particular polymer, catalyst and solvent employed.

Removal of the solvent from the solutions of polymer and catalyst may be effected in any desired manner. Thus, when evaporating the solution at room or elevated temperatures, atmospheric or subatmospheric pressures may be employed. However, where it is intended to subject the residual dry composition to a heat treatment to hasten the cross-linking action, a continuous heat treatment is preferably employed wherein in the initial stages the applied heat causes the vaporization and removal of the solvent.

The cross-linking action may be carried out at any temperature ranging from room temperature up to a temperature of about 200 to 250° C. for periods of time ranging from about 5 minutes up to as much as 16 to 22 days and at a pressure below, at or above atmospheric. The extended periods of time, i.e. 16 to 22 days, are required for the cross-linking action where room temperatures are employed for evaporating the solvent; therefore, since this is impractical in most cases, it is preferred to evaporate the solution by heating the same to temperatures of about 200 to 250° C., at which temperatures the solvent is removed and the cross-linking action completed in a period of from 5 minutes to 8 hours. It will be understood that the degree of cross-linking of the polymer and the extent of modification of the properties of the products due to the cross-linking may be controlled and/or adjusted readily by the type and amount of Friedel-Crafts catalyst used, as well as by the duration and temperature of treatment of the polymer selected for cross-linking in accordance with this invention.

While higher alkyl vinyl ether polymers such as n-hexyl- and n-octadecyl-vinyl ethers may be treated in accordance with this invention, the most advantageous results with respect to product characteristics are obtained when the lower alkyl vinyl ether polymers are cross-linked in accordance with the process of this invention. Examples of said latter polymers are those derived by the polymerization of the methyl, ethyl, propyl, isopropyl, butyl and isobutyl vinyl ethers and the like, as well as mixtures thereof. These polymers are thermoplastic and balsam-like in nature, water-white to amber in color and soluble to at least some extent in a variety of solvents such as water, ethyl alcohol, isopropyl alcohol, acetone, 2-butanone, ethyl ether, n-pentane, benzene, toluene and the like.

The Friedel-Crafts type and related catalysts which may be employed in the process of this invention include metallic and metalloid halides and certain sulfates including the halides of aluminum, copper, iron, tin, zinc and boron such as $AlBr_3$, $AlCl_3$, $CuCl_2$, $FeCl_3$, $SnCl_4$, $ZnCl_2$, $SbCl_5$, $TiCl_4$, $TeCl_4$, $BiCl_3$, $BeCl_3$ and $BF_3$, as well as copper sulfate, hydrofluoric acid and mixtures of catalysts. In general, the catalysts are employed in amounts of about 0.1 to 5% by weight of the polymer, but it is preferred to employ from about 1 to 5% of the catalyst to effect the desired cross-linking.

It has been found that the cross-linked lower alkyl vinyl ether polymers produced in accordance with this invention have decreased solubility in water and organic solvents, decreased thermoplasticity and fluidity, and increased elasticity, toughness, hardness and cloud point, as compared with the initial, i.e. untreated, polymers. Accordingly, the cross-linked polymers are suitable for use in a variety of new and useful industrial applications by reason of their developed properties as, for example, in the production of plastic sheeting, floor and wall tiles, adhesives and the like.

The instant invention is further illustrated by the following eamples which are not intended to be in any way limitative.

*Example I*

A 5 gram portion of methyl vinyl ether polymer (K=53; specific viscosity 0.77 for 1 g./100 ml. benzene solution at 25° C.) was dissolved, by shaking, in 15 grams of ethyl alcohol containing 1.1 grams of cupric chloride dihydrate. A homogeneous, green-colored, clear solution was obtained after shaking the above components in a 10 dram vial for four hours at room temperature. A spot of this solution, approximately three inches in diameter, was flowed onto a clean glass plate and air-dried for ½ hour at room temperature. The partially dry film was then placed in a 110° C. oven for one hour. The resulting dried film possessed the following properties: (1) dark brown color, (2) non-tacky, (3) rubbery, and (4) insoluble in acetone.

A portion of the above solution was set aside and was found to be substantially free of cross-linking in the polymer after standing at room temperature for three months.

*Example II*

A 5 gram portion of isobutyl vinyl ether polymer (specific viscosity 0.45 for 1 g./100 ml. benzene solution at 25° C.) was dissolved in 24.75 grams of isopropyl alcohol containing 0.25 gram of zinc chloride. A clear fluid water-white, homogeneous solution was obtained by shaking the ingredients named above in a 10 dram vial overnight at room temperature. A portion of this solution was flowed onto a clean glass plate to cover a spot approximately three inches in diameter, placed in the oven for 15 minutes at 160° C. to obtain a dried film having the following properties: (1) soft, (2) tacky, (3) light brown color, (4) soluble in 2-butanone. The same sample was replaced in the oven at 160° C. for an additional 105 minutes (making a total of 2 hours at 160° C.) to obtain a film possessing the following properties: (1) rubbery, (2) slightly tacky, (3) light brown color, (4) insoluble in 2-butanone.

Another portion of the above solution was set aside and after being stored for three months at room temperature the polymer was found to be substantially free of cross-linking.

*Example III*

A 20 gram portion of methyl vinyl ether polymer (K=53; specific viscosity 0.77 for 1 g./100 ml. benzene solution at 25° C.) and one gram of anhydrous, granular aluminum chloride were milled for 10 minutes in a Werner-Pfleiderer mill. It was discharged from the mill as a tacky, brown, rubbery mass with grains of aluminum chloride evenly dispersed. It was mostly acetone-soluble when removed from the mill. However, a non-tacky, tough, resilient, acetone-insoluble sample was obtained when a small portion of the above mixture was heated for one hour at 160° C.

*Example IV*

A 3 gram portion of cyclohexyl vinyl ether polymer (K=42.2; specific viscosity 0.473 for 1 g./100 ml. benzene solution at 25° C.) was dissolved in 17 grams of diethyl ether containing 0.15 gram of zinc chloride, dry granular. A homogeneous, colorless, slightly hazy solution was obtained by shaking the above components in a 10 dram vial, by hand, in less than ½ hour. A spot of this solution, approximately three inches in diameter, was flowed onto a clean glass plate and air-dried overnight at room temperature. The dried film was placed in a 110° C. oven for four hours to produce a film having the following properties: (1) brittle, (2) slightly yellow and (3) slightly soluble in diethyl ether (1% concentration). A portion of the film was placed in a 200° C. oven for an additional two hours. This treatment produced a film possessing the following properties: (1) brittle, (2) light brown and (3) insoluble in diethyl ether (1% concentration).

A similarly prepared and treated film, without any catalyst, was found to possess the following properties: (1) brittle, (2) dark yellow and (3) completely soluble in diethyl ether (1% concentration).

It is to be understood that the foregoing detailed description is merely given by way of illustration and that many variations may be made therein without departing from the spirit of our invention.

Having described our invention, what we desire to secure by Letters Patent is:

1. The process which comprises forming a clear, homogeneous solution of an alkyl vinyl ether polymer wherein the alkyl group contains from 1 to 6 carbon atoms and about 0.1 to 5% by weight of said polymer of a Friedel-Crafts catalyst in a mutual solvent for said polymer and said catalyst at room temperature, removing said solvent from said solution to form a dry residue containing said polymer and said catalyst, and heating said dry residue for a time sufficient to effect cross-linking in said polymer.

2. The process which comprises forming a clear, homogeneous solution of an alkyl vinyl ether polymer wherein the alkyl group contains from 1 to 6 carbon atoms and about 0.1 to 5 % by weight of said polymer of a Friedel-Crafts catalyst in a mutual solvent for said polymer and said catalyst at room temperature, removing said solvent from said solution to form a dry residue containing said polymer and said catalyst, and heating said dry residue at about 100 to 200° C. for a time sufficient to effect cross-linking in said polymer.

3. The process which comprises forming a clear, homogeneous solution of an alkyl vinyl ether polymer wherein the alkyl group contains from 1 to 6 carbon atoms and about 0.1 to 5% by weight of said polymer of a Friedel-Crafts catalyst, selected from the group consisting of $AlCl_3$, $CuCl_2$, $ZnCl_2$, $FeCl_3$, $SnCl_4$ and $BF_3$ in a mutual solvent for said polymer and said catalyst at room temperature, removing said solvent from said solution to form a dry residue containing said polymer and said catalyst, and heating said dry residue at about 100 to 200° C. for a time sufficient to effect cross-linking in said polymer.

4. The process which comprises forming a clear, homogeneous solution of methyl vinyl ether polymer, cupric chloride and ethyl alcohol at room temperature, the amount of cupric chloride being about .1% by weight of said polymer, removing the ethyl alcohol from said solution to form a dry residue containing methyl vinyl ether polymer and cupric chloride, and heating said dry residue for one hour at 110° C. whereby there is obtained a product which is dark brown in color, non-tacky, rubbery and insoluble in acetone.

5. The process which comprises forming a clear, homogeneous solution of isobutyl vinyl ether polymer, zinc chloride and isopropyl alcohol at room temperature, removing the isopropyl alcohol from said solution to form a dry residue containing isobutyl vinyl ether polymer and zinc chloride, and heating said dry residue for two hours at 160° C. whereby there is obtained a product which is light brown in color, slightly tacky, rubbery and insoluble in 2-butanone.

6. The process which comprises forming a clear, homogeneous solution of isobutyl vinyl ether polymer, zinc chloride and isopropyl alcohol, at room temperature the amount of zinc chloride being 5% by weight of said polymer, removing the isopropyl alcohol from said solution to form a dry residue containing isobutyl vinyl ether polymer and zinc chloride, and heating said dry residue for two hours at 160° C. whereby there is obtained a product which is light brown in color, slightly tacky, rubbery and insoluble in 2-butanone.

7. The process for forming a clear, homogeneous solution of polymer and catalyst stable against cross-linking for an appreciable length of time, which comprises dissolving, in a mutual solvent at room temperature, an alkyl vinyl ether polymer wherein the alkyl group contains from 1 to 6 carbon atoms and about 0.1 to 5% by weight of said polymer of a Friedel-Crafts catalyst.

8. The process for forming a clear, homogeneous solution of polymer and catalyst stable against cross-linking for an appreciable length of time, which comprises dissolving, in a mutual solvent, at room temperature an alkyl vinyl ether polymer wherein the alkyl group contains from 1 to 6 carbon atoms and about 0.1 to 5% by weight of said polymer of a Friedel-Crafts catalyst selected from the group consisting of $AlCl_3$, $CuCl_2$, $ZnCl_2$, $FeCl_3$, $SnCl_4$ and $BF_3$.

9. The process for forming a clear, homogeneous solution of polymer and catalyst stable against cross-linking for an appreciable length of time, which comprises dissolving, in ethyl alcohol, at room temperature methyl vinyl ether polymer and about 0.1% by weight of said methyl vinyl ether polymer of cupric chloride.

10. The process for forming a clear, homogeneous solution of polymer and catalyst stable against cross-linking for an appreciable length of time which comprises dissolving, in isopropyl alcohol, at room temperature isobutyl vinyl ether polymer and about 5% by weight of said isobutyl vinyl ether polymer of zinc chloride.

References Cited in the file of this patent

UNITED STATES PATENTS 2,104,000     Reppe et al. _____ Dec. 28, 1937

OTHER REFERENCES

Bevington et al.: J. Chem. Soc. Part I (1949), pp. 482–485 (pg. 484 only needed).

Bevington et al.: J. Chem. Soc. Part I (1948), pp. 771–774.